Jan. 28, 1969     K. BRAND     3,423,940

MAIN PRESSURE CYLINDER FOR HYDRAULIC POWER TRANSMISSION SYSTEMS

Filed July 24, 1967

INVENTOR
Karl Brand
By: Stevens, Davis, Miller & Mosher
Attorneys

United States Patent Office 3,423,940
Patented Jan. 28, 1969

---

3,423,940
MAIN PRESSURE CYLINDER FOR HYDRAULIC POWER TRANSMISSION SYSTEMS
Karl Brand, Ebern, Germany, assignor to Kugelfischer Georg Schafer & Co., Schweinfurt, Germany
Filed July 24, 1967, Ser. No. 655,395
Claims priority, application Germany, Dec. 21, 1966,
K 60,979
U.S. Cl. 60—54.6
Int. Cl. F15b 7/06; F01b 31/00
5 Claims

ABSTRACT OF THE DISCLOSURE

In a main pressure cylinder for hydraulic power transmission and particularly for hydraulic brake systems in automotive vehicles having a single piston or twin piston system, each piston of which has an annular piston packing which serves as a valve, an improved packing having an inner lip held against the piston by a supporting plate resting firmly against a shoulder of the piston and extending through the packing into the cylinder, and the supporting plate provided with recesses distributed on its periphery extending from its outer edge to the region against which the inner lip lies and having ribs spaced from the outer lip of the packing.

Background of the invention

The present invention relates to a main cylinder for a hydraulic transmission system, and particularly for a hydraulic brake system for automotive vehicles, with single-piston or twin-piston systems, in which each piston has an annular piston packing serving as a valve.

In a braking system of this type upon the release of braking action, the primary packing which serves as a valve draws liquid in through the annular piston space behind it from the afterflow container of the cylinder pressure chamber.

The lower the resistance which the packing lip affords to the vacuum developed, the more rapidly the piston will return to its starting position and the more dependable the evacuation process will be. Precautions must be taken to see that the packing is not pulled from the seat by the suction. This applies both to single-piston and to twin-piston arrangements in the case of tandum cylinders.

In one embodiment of the prior art (German Patent 1,890,515), a spring washer is employed and fitted to the inside of the annular groove packing to prevent the packing from being displaced. In another embodiment (German Patent 877,520), the packing is held by a spring washer which is also adapted to the inside of the annular groove packing. The disadvantage of holding the packing in this manner resides in the fact that the back of the packing cannot be lifted off at all or only very slightly from the wall of the piston to permit the liquid to flow from the piston ring space over the outer lip of the packing. This becomes particularly difficult when the primary packing has an outside diameter of 28 millimeters and less, since the inner space becomes narrower and narrower between the outer lip and the seating lip. Since the bending of the packing can start only with the outside diameter of the spring washer, the bending lever is very unfavorable and at the place of application there is produced an over-stress which leads to premature failure due to excessive buckling stress.

In another embodiment of the prior art (German Patent 1,859,938), this disadvantage is eliminated by the fact that the annular packing is held against the piston head by a collar against which the inner lip rests. This embodiment, to be sure, as a result of the lower height of the collar, permits a sufficiently wide lifting of the packing from the piston head but has the disadvantage that the outer lip upon a strong vacuum lies in the gap between the collar and the cylinder and thereby prevents the return of the piston. Also in this embodiment no covering disc can be provided between the packing bottom and the piston. As is known a covering disc is necessary in order that the packing bottom does not force its way into the suction bores in the piston.

Summary of the invention

An improved packing and supporting plate for a packing serves as a valve in the pressure cylinder for a hydraulic power transmission having a single-piston or twin-piston system. The packing has an inner lip held against the piston by a supporting plate resting firmly against a shoulder of the piston and extending through the packing into the cylinder, and the supporting plate provided with recesses distributed on its periphery extending from its outer edge to the region against which the inner lip lies and having ribs spaced from the outer lip of the packing.

It is an object of the present invention to provide a main pressure cylinder in which the packing acting as a valve can be lifted sufficiently far from the piston head to permit a rapid flow of the liquid without the packing forcing its way into the gap between the support and the cylinder.

This result is achieved in the present invention by the manner in which the packing supported by a supporting plate against the piston is held at its inner lip. The supporting plates lies firmly against the shoulder of the piston which extends into the packing and is inserted with a slight clearance into the cylinder. Recesses are provided in the supporting plate or disc extending from the outer edge and up through the region against which the inner lip rests, and are distributed on its periphery, with ribs spaced from the outer lip of the packing.

Due to the insertion of a supporting plate or disc which is provided with recesses and which can sit loosely on an extension of the piston or else be shrunk onto it, and has ribs extending up to the cylinder wall, the outer lip can rest against the ribs of the disc without jamming the lip between the disc and the cylinder. The lifting of the lip by a sufficiently large amount is assured by the fact that there is sufficiently large spacing in the vicinity of the outer lip when the packing lies against the piston. The ribs of the plate prevent the packing from lifting off its feet and with no supporting of the lip at the recesses of the plate, the liquid can readily flow through.

In order to obtain proper spacing between the supporting plate and the upper lip the ribs of the supporting plate may be bent at an angle so that they are staggered in the direction towards the pressure space with respect to that part of the plate against which the inner plate rests.

The distance between the supporting plate and the outer lip is maintained in such a manner that the outer lip packing is shorter than the inner lip.

In a main cylinder with a two twin-piston arrangement having a compression spring arranged between the adjacent ends of the two pistons, and the pistons being held axially apart from each other against the action of the spring by a locking means associated with the two pistons, the compression spring can in accordance with an object of the present invention serve to hold the supporting plate. In this case, it is then no longer necessary to fasten the supporting plate separately to the piston.

*A preferred embodiment of the invention*

Figure 1:
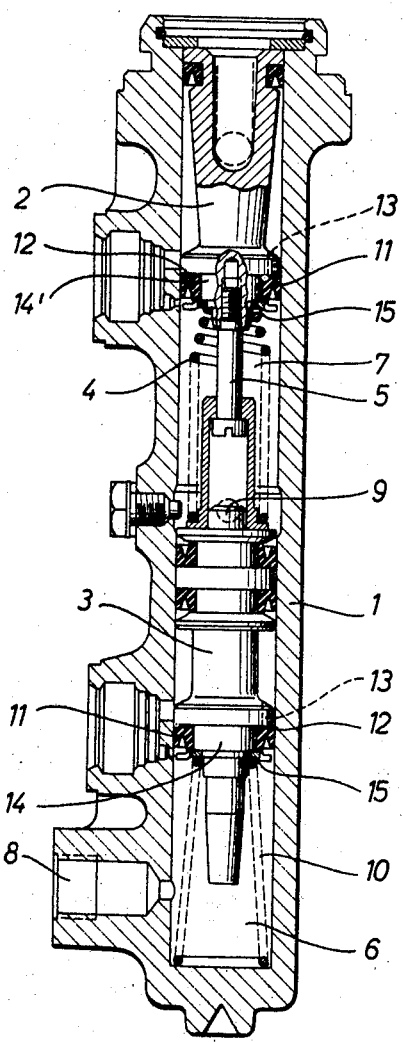
FIGURE 1 is a sectional view of a cylinder having a twin-piston arrangement and a primary packing supported in accordance with the present invention.
Figure 2:
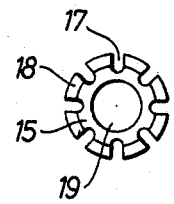
FIGURE 2 shows a detailed view of a supporting plate made in accordance with the present invention.
Figure 3:
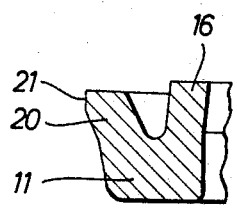
FIGURE 3 is a partial sectional view of an annular packing material in accordance with the present invention.

As shown in FIGURE 1 a tandem main cylinder 1 is provided with a main piston 2 and a secondary piston 3 and a compression spring 4. The pistons are held an axial distance apart from each other against the action of the spring 4 by a locking device 5 associated with the two pistons. The two pistons divide the cylinder into two independent pressure chambers 6 and 7 which have separate connections 8 and 8 for their respective brake circuits. The pistons are displaceable together in view of the compression spring 4 within the blocking device 5 and are brought into their initial position by a compression spring 10 which rests against the end of the cylinder.

In order to seal the individual pistons from their associated pressure space, the pistons 2 and 3 are each equipped with a primary packing 11, developed as an annular packing and resting with the interposition of a covering disc 12 against the piston head. The piston head is provided with passage bore holes 13 for the hydraulic fluid. The annular packings 11 are seated in each case on respective shoulders 14 and 14' of the pistons, with the shoulders extending through their annular packings. The annular packings 11 are held in position by supporting plates 15. Only the inner lip 16 of annular packing 11 rests against the supporting plate 15 which is held in a suitable manner on the piston and rests against the shoulders 14 and 14' respectively. The supporting plate 15 corresponds except for a slight clearance which is necessary for the mounting, to the inside diameter of the cylinder and has recesses 17 distributed over its periphery extending radially from the outer edge into the vicinity of the bore hole 19 with which the supporting plate is mounted on the piston extension. The inner lip 16 is intended to rest upon the portion of the bore surface ring remaining. The ribs 18 formed between the recesses 17 are bent at an angle to form a space between the outer lip 20 and the rib 18. The space between the outer lip 20 and the ribs 18 in supporting plate 15 is further increased by the fact that the outer lip is shorter than the inner lip. This space is necessary to make it possible for the packing to lift off of the piston head.

Since the annular packing is held only at its inner lip, uniform bending of the outer part of the packing takes place during the subsequent drawing of the brake fluid in its delivery area. The additional drawing in of the brake fluid is facilitated by the fact that the outer lip which extends obliquely outward has at its front outer end a cylindrical section 21 in which the thickness of the lip is reduced. The width of the cylindrical section is generally 1.5 millimeters. Supporting plate 15 can be shrunk onto its shoulder on the piston or it can be pressed against the shoulder 14 by the spring 4 which as a result of the locking device is clamped between the two pistons 2 and 3.

While a preferred embodiment of the invention has been shown it is to be understood that various changes in the elements may be made by those skilled in the art without departing from the spirit of the invention as claimed.

What is claimed is:

1. In a pressure cylinder for a hydraulic power transmission of the type having a single or twin-piston with each piston having an annular piston packing serving as a valve, the improvement comprising said packing including an inner lip and an outer lip, a supporting plate for holding said inner lip against the piston, said supporting plate being mounted on a shoulder on the piston extending through the packing, said supporting plate including ribs and recesses distributed about its periphery, said recesses extending from the outer edge of the supporting plate to the region against which the inner lip lies, the ribs being positioned so as to be spaced from the outer lip of the packing.

2. A device as defined in claim 1, wherein said outer lip extends obliquely outwardly and is reduced in thickness by a cylindrical development formed at its outer end.

3. A device as defined in claim 2, wherein said supporting plate ribs are bent in order to provide proper spacing between them and the outer lip.

4. A device as defined in claim 3, wherein the outer lip of the packing is shorter than the inner lip.

5. A device as defined in claim 1, wherein the main cylinder is of the two-piston type with a compression spring arranged between adjacent ends of the two pistons, a blocking device is associated with the two pistons to hold the pistons an axial distance apart from each other in opposition to the action of said spring, and said compression spring maintains at least one of said supporting plates in position.

References Cited

UNITED STATES PATENTS

| 2,884,291 | 4/1959 | Whitten | 92—240 XR |
| 2,977,767 | 4/1961 | Randol | 60—54.6 |
| 3,277,650 | 10/1966 | Cripe | 60—54.5 |
| 3,321,914 | 5/1967 | MacDuff | 60—54.5 XR |

MARTIN P. SCHWADRON, *Primary Examiner.*

R. R. BUNEVICH, *Assistant Examiner.*

U.S. Cl. X.R.

60—54.5; 92—130, 249